L. G. MARSHALL.
Amalgamator.
No. 34,115.  Patented Jan. 7, 1862.
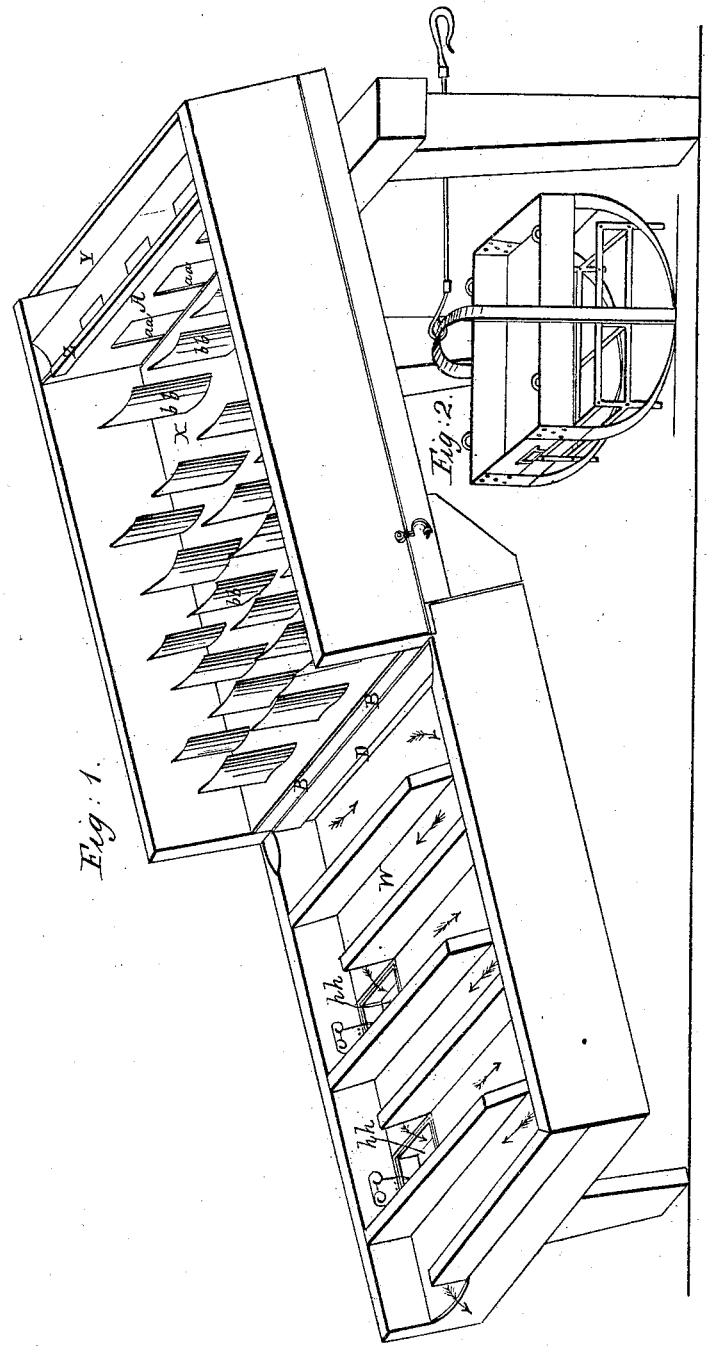

UNITED STATES PATENT OFFICE.

LOOMIS G. MARSHALL, OF SAN FRANCISCO, CALIFORNIA.

IMPROVED AMALGAMATOR.

Specification forming part of Letters Patent No. 34,115, dated January 7, 1862.

*To all whom it may concern:*

Be it known that I, LOOMIS G. MARSHALL, of the city and county of San Francisco, and State of California, have invented a new and Improved Apparatus for Amalgamation of Precious Metals; and I do hereby declare that the following is a full, clear, and exact description of the construction and operation of the same, reference being had to the annexed drawings, making a part of this specification.

Figure 1 represents the amalgamator, consisting of two tables. Fig. 2 represents an apparatus for roasting concentrated sulphurets.

The upper table, Fig. 1, has an equalizer, A, formed by a plate stretching across the table from side to side, having holes $a\ a$ at the bottom part thereof, which can be more or less opened by means of a movable plate or slide, Z, provided with corresponding holes, so that the liquid mass, in passing out of the trough $y$, will be distributed equally over the table X.

$b\ b$ are rows or tiers of batteries, so arranged on the metallic surface-plate X of said table that one row or tier will be opposite the spaces between those of the row or tier above. These batteries are made of copper, and in the form of an arc of a circle. The lower end, B, of the upper table rests upon the upper end, D, of the lower table, W, Fig. 1. This lower table is divided into compartments open at alternate ends, as shown in the drawings. Each of these compartments is furnished with a sink or basin, $h$, to catch the sulphurets. Both tables are lined with plates X and W of copper.

Underneath the upper table is placed a galvanic battery, (not represented in the drawings,) the positive wire of said battery connecting with one end, and the negative wire of it with the other end, of the surface-plates X and W of the tables, forming one incline, so as to produce a proper galvanic action.

Fig. 2 is composed of a shallow pan, of iron or other metal, furnished with rockers and placed over a fire-grate. The surface of the tables and the batteries $b\ b$ are highly charged with gold amalgam.

Operation: The upper table resting upon the lower one, as described above, the gravel or dirt from placer diggings, or pulverized ore mixed with water, is allowed to flow upon the upper end of the first table, and by means of the equalizer is distributed evenly over the surface of the same. In its passage down the table its course is arrested by the batteries $b\ b$, forming numerous perpendicular eddies acting to catch the fine particles of gold, they being deposited on the surface of the table and batteries by the eddies, the effect of the galvanic battery being to cause the precious metal to adhere to the table as an amalgam. Should there be any sulphurets or black sand, they will pass down upon the lower table, in the direction as indicated by the arrows, and be deposited, in a concentrated state, in the sinks or basins $h\ h$, ready for chemical or mechanical treatment. As soon as a sufficient quantity of these sulphurets have been concentrated they are placed in the shallow pan, Fig. 2, over a fire, and stirred about by the rockers till properly roasted, when they are again thrown upon the table and pass through the same operation as before.

By use of this apparatus the tedious operation of washing the blankets is done away with; also a large amount of mechanical and manual labor is saved.

Having described my invention, what I claim, and desire to secure by Letters Patent, is—

The combination of trough Y, adjusting-slide Z, metallic surface-plates X W, of two inclined tables, batteries $b$ of the upper table and compartments and sinks $h$ of the lower table, all the parts arranged in relation to each other, as above described, so that a galvanic current may be made to pass over both tables and all the batteries $b$.

LOOMIS G. MARSHALL.

Witnesses:
WM. WILLSON LAWTON,
J. DANIEL.